(12) United States Patent
Nakaniwa

(10) Patent No.: US 11,506,492 B2
(45) Date of Patent: Nov. 22, 2022

(54) TARGET SPHERE AND TARGET DEVICE

(71) Applicant: KUMONOS Corporation, Minoo (JP)

(72) Inventor: Kazuhide Nakaniwa, Minoo (JP)

(73) Assignee: KUMONOS CORPORATION, Minoo (JP)

(*) Notice: Subject to any disclaimer, the term of this patent is extended or adjusted under 35 U.S.C. 154(b) by 66 days.

(21) Appl. No.: 17/223,706

(22) Filed: Apr. 6, 2021

(65) Prior Publication Data

US 2021/0318119 A1 Oct. 14, 2021

(30) Foreign Application Priority Data

Apr. 10, 2020 (JP) .............................. JP2020-071145

(51) Int. Cl.
*G01C 15/06* (2006.01)
*G01C 9/28* (2006.01)
*G01C 9/34* (2006.01)

(52) U.S. Cl.
CPC ............. *G01C 15/06* (2013.01); *G01C 9/28* (2013.01); *G01C 9/34* (2013.01)

(58) Field of Classification Search
CPC ........... G01C 15/06; G01C 15/08; G01C 9/36
USPC ......................................................... 33/293
See application file for complete search history.

(56) References Cited

U.S. PATENT DOCUMENTS

| | | | |
|---|---|---|---|
| 5,255,441 A * | 10/1993 | Burgess | G01C 15/06 33/295 |
| 5,566,460 A * | 10/1996 | Bates | G01C 15/06 33/296 |
| 5,856,689 A | 1/1999 | Suzawa | |
| 7,541,974 B2 * | 6/2009 | Scherzinger | G01C 15/00 701/472 |
| 7,669,342 B1 * | 3/2010 | Crain | G01C 9/28 33/372 |
| 8,769,838 B2 * | 7/2014 | Ward | G01C 15/06 33/293 |
| 8,806,769 B2 * | 8/2014 | Tan | G01C 9/36 33/378 |
| 10,119,818 B2 * | 11/2018 | Maar | G01B 11/0608 |
| 11,169,268 B1 * | 11/2021 | Schaefer | G01S 17/46 |
| 2011/0235143 A1 * | 9/2011 | Graham | G01C 15/02 359/200.1 |

(Continued)

FOREIGN PATENT DOCUMENTS

| | | |
|---|---|---|
| CN | 101819271 B | 10/2012 |
| JP | S49126870 U | 10/1974 |

(Continued)

OTHER PUBLICATIONS

The extended European Search Report dated Sep. 2, 2021, by the European Patent Office in corresponding European Application No. 21167134.2. (9 pages).

(Continued)

*Primary Examiner* — George B Bennett
(74) *Attorney, Agent, or Firm* — Buchanan Ingersoll & Rooney PC

(57) ABSTRACT

A surveying target sphere for use in a three-dimensional measurement has a spherical surface having a constant radius from a center and includes a north pole, a south pole, and a central axis passing through the center of the surveying target sphere and linking the north pole and the south pole, and a level is mounted at the north pole.

14 Claims, 3 Drawing Sheets

(56) References Cited

U.S. PATENT DOCUMENTS

| | | | | |
|---|---|---|---|---|
| 2018/0024245 A1* | 1/2018 | Reed, Jr. | ............... | G01S 7/497 |
| | | | | 356/4.01 |
| 2020/0018598 A1* | 1/2020 | Hollenstein | ............ | G01C 15/06 |
| 2020/0096747 A1* | 3/2020 | Jensen | ................ | G01C 15/006 |
| 2020/0141729 A1* | 5/2020 | Nishita | ................ | G01S 7/4817 |
| 2020/0142031 A1* | 5/2020 | Nishita | ................ | G01C 15/02 |
| 2020/0340811 A1* | 10/2020 | Kumagai | ............... | G01C 15/06 |
| 2021/0088334 A1* | 3/2021 | Bembenek | ............ | G01C 15/06 |
| 2021/0124021 A1* | 4/2021 | Yasutomi | ................ | G01C 9/06 |

FOREIGN PATENT DOCUMENTS

| | | |
|---|---|---|
| JP | S5092256 U | 8/1975 |
| JP | S5337550 U | 4/1978 |
| JP | 2006162444 A | 6/2006 |
| JP | 2015145787 A | 8/2015 |

OTHER PUBLICATIONS

Japanese Office Action (Notification of Reasons for Refusal) dated Jun. 23, 2020, issued in the corresponding Japanese Patent Application No. 2020-071145, and an English Translation thereof. (9 pages).

* cited by examiner

TARGET SPHERE AND TARGET DEVICE

BACKGROUND OF THE INVENTION

1. Field of the Invention

The present invention relates to a surveying target sphere.

The present invention also relates to a target sphere suitable for use in a three-dimensional measurement using a measuring device such as a three-dimensional laser scanner, and a target device including the target sphere.

2. Description of the Related Art

JP 2006-162444 A discloses a spherical target and a target device including the spherical target. The spherical target has a sphere. A bottom portion (a south-pole portion) of the sphere has a coupling portion to which an upper end of a pin pole is coupled. In order to accurately position the center of the spherical target directly above a reference survey point, a level which is so-called a circular vial is mounted to the pin pole. In setting the spherical target, an operator tries to accurately position the center of the spherical target above the reference survey point by positioning the bubble contained in the circular vial at the center of the circular vial while viewing the circular vial from above.

Actually, however, the existence of the sphere prevents the operator from viewing the level from directly above, making it difficult to see whether the bubble of the circular vial positions accurately at the center of the level, which results in that the center of the sphere may slightly be deviated from a vertical line passing through the reference point and the deviation may adversely affect the survey result.

SUMMARY OF THE INVENTION

An object of the present invention is to solve the problem and to provide a target sphere and a target device capable of accurately positioning a sphere above the reference survey point.

For this purpose, a surveying target sphere according to an embodiment of the present invention for use in the three-dimensional measurement comprises a spherical surface having a radius measured from a center of the spherical surface. The surveying target sphere has a north pole, a south pole, a central axis passing through the center of the surveying target sphere and the north and south poles, and a level is mounted at the north pole.

According to the target sphere and a target device comprising the target sphere, in setting the target sphere of the target device directly above a reference survey point, the level mounted at the north-pole portion can be viewed from directly above because nothing blocks operator's view, allowing the target sphere to be accurately positioned on the vertical line passing through the reference survey point, which ensures an increased reliability for the result of measurements obtained using the target sphere.

DESCRIPTION OF THE PREFERRED EMBODIMENTS

With reference to the accompanying drawings, a target sphere and a target device according to an embodiment of the present invention will be described.

Figure 1:
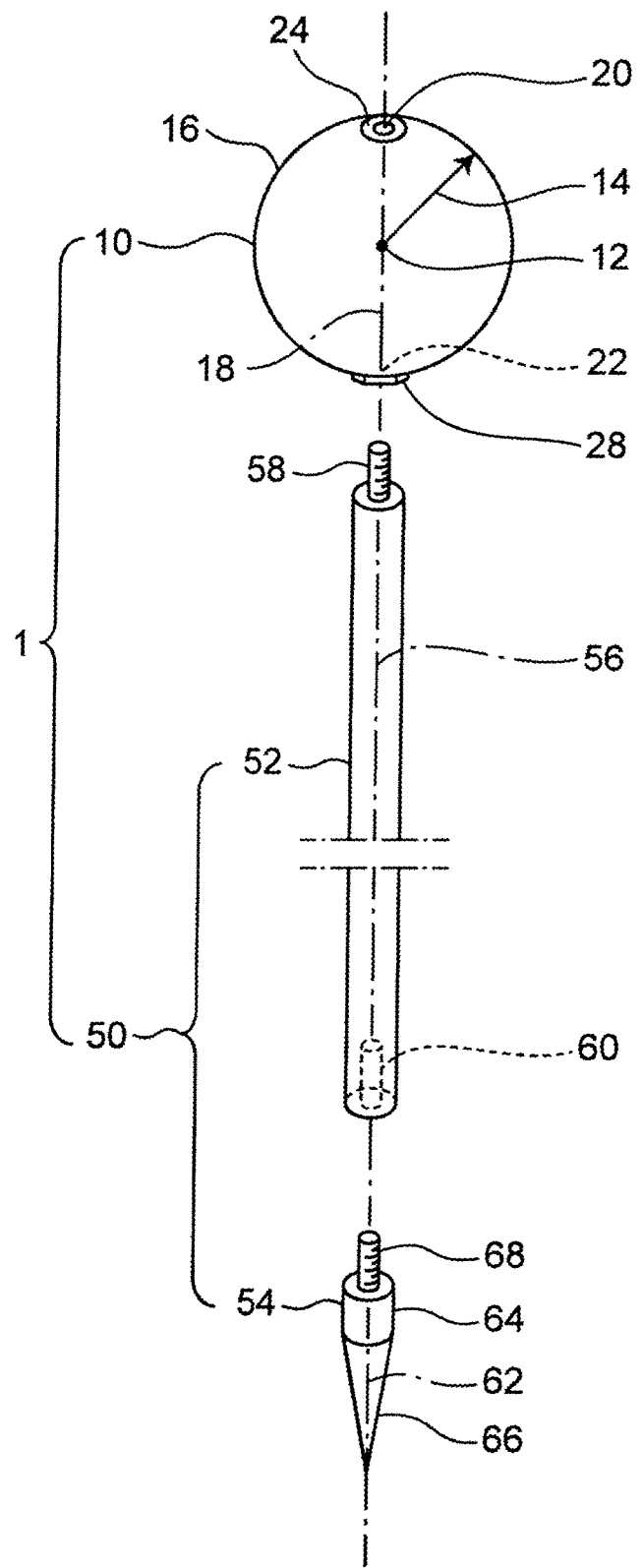
FIG. 1 is an exploded perspective view of a target device according to an embodiment of the present invention.

FIG. 1 shows a target device 1 according to an embodiment of the present invention.

[Overall Structure]

The target device 1 shown in the drawing has a target sphere (hereinafter referred to as "sphere") 10 and a pin pole 50.

The sphere 10 is a perfect sphere having a spherical surface 16 with a constant radius 14 from a center 12. Although not shown, the sphere 10 can be manufactured by injecting a suitable resin into two mold-halves each having hemispherical cavities, for example. The color of the sphere 10 is not limited, and an appropriate color may be selected depending on a measurement environment.

The sphere 10 has a central axis 18 passing through the center 12 of the sphere 10 and oriented in the vertical direction (gravity direction) in use (i.e., in surveying). In this application, upper and lower ends of the sphere 10 at intersections of the central axis 18 and a spherical surface 16 are referred to as a north pole 20 and a south pole 22, respectively.

Figure 3:
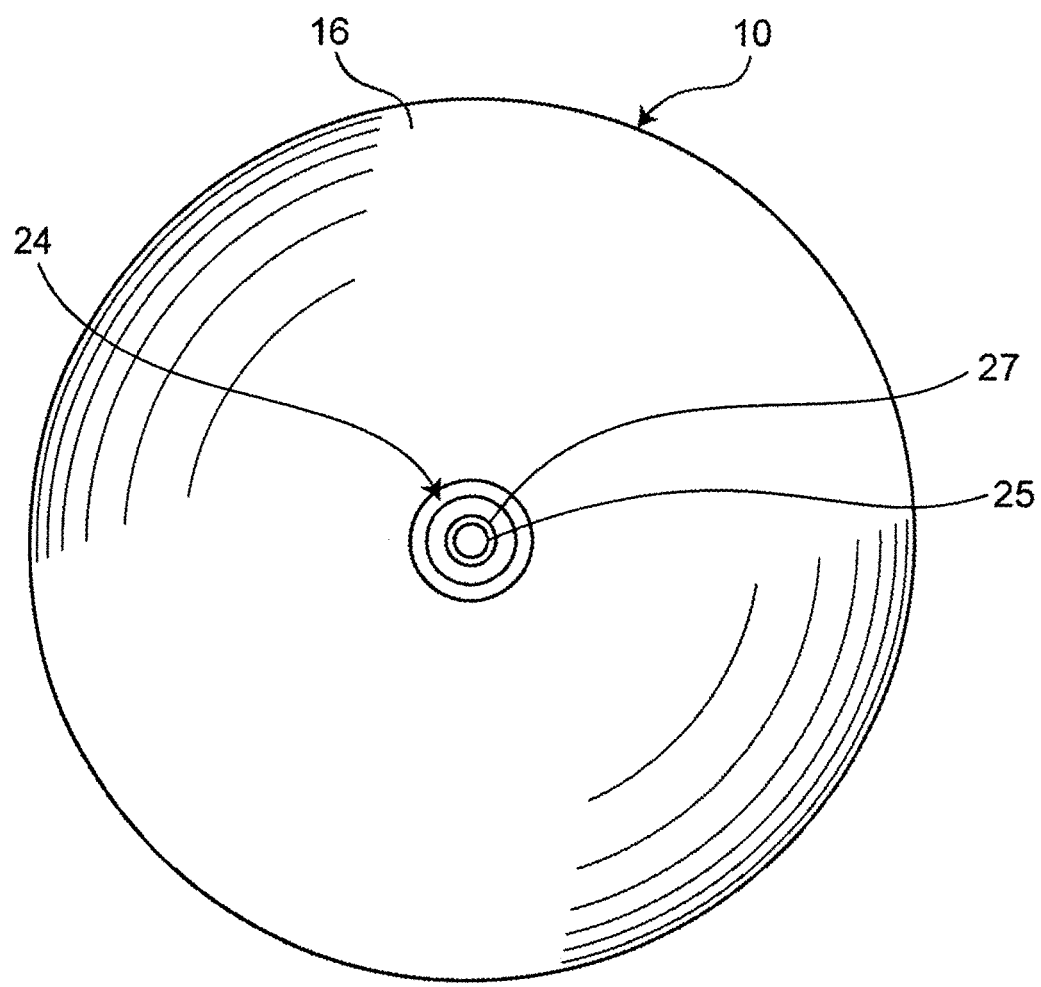
FIG. 3 is a plan view of the target sphere of the target device shown in FIG. 1.

A level 24 is fixed to a north-pole 20 or a north-pole region including the north-pole 20 of the sphere 10. In the embodiment, the level 24 is a circular bubble level. Although not shown, the level 24 has an outer shape defined by a cylindrical outer circumferential surface, an upper surface, and a lower surface. The level 24 has a cavity defined inside the level. The cavity is filled with a liquid and a small air bubble. As shown in FIG. 3, the upper surface of the level 24 has a circle 27 drawn around a central axis of the cylindrical outer circumferential surface such that the bubble 25 positions at the center of the circle 27 while the level 24 is placed on a horizontal plane orthogonal to the vertical axis.

Figure 2:
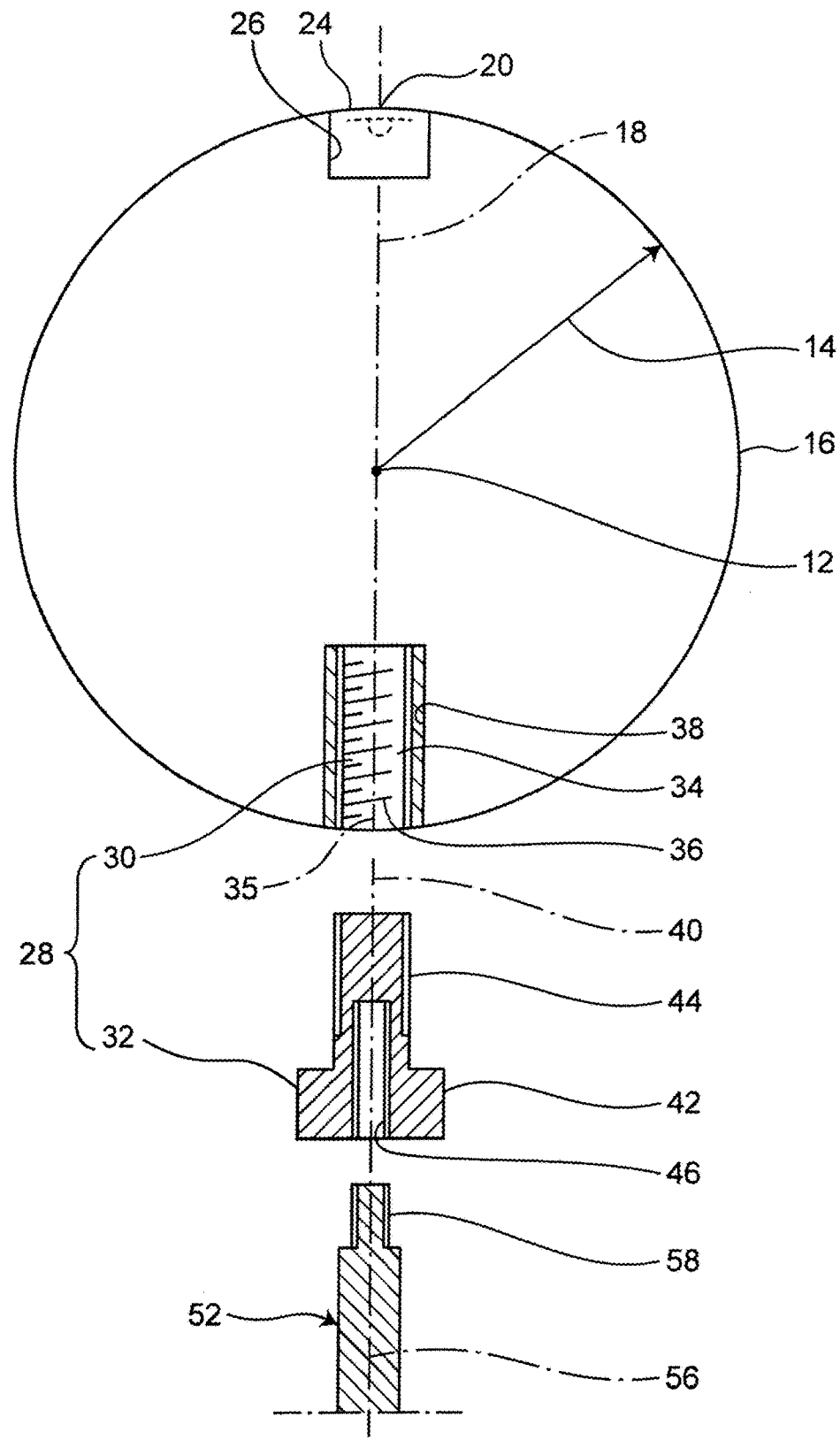
FIG. 2 is a cross-sectional view of the target sphere and a coupling mechanism of the target device shown in FIG. 1.

Referring to FIG. 2, the level 24 is embedded in the sphere 10. For this purpose, the north-pole 20 of the sphere 10 has an upper hole 26 or a recess formed around the central axis 18 along the central axis 18. The upper hole 26 can be formed integrally with the sphere at the time of molding by disposing an inner projection having a shape corresponding to the upper hole 26 on the inner surface of the mold. Alternatively, the upper hole 26 can be formed by machining the molded sphere.

The size and shape of the upper hole 26 is preferably the same as the size and shape of the outer circumferential cylindrical surface of the level 24. This ensures that the level 24 is fixed simply by fitting the level into the upper hole 26. In order to fix the level 24 to the sphere 10, the level 24 may be fitted into the upper hole 26 with an adhesive applied to an inner surface of the upper hole 26 in advance. The central axis of the upper hole 26 coincides with the central axis of the sphere 10 such that the central axis of the level 24 fitted in the upper hole 26 precisely coincides with the central axis 18 of the sphere.

A coupling mechanism 28 coupling the sphere 10 and the pin pole 50 is provided at a south-pole or a south-pole region including the south-pole 22 of the sphere 10. In the embodiment, the coupling mechanism 28 has a sphere coupling portion 30 and a pole coupling portion 32.

The sphere coupling portion 30 has a hollow cylindrical member 34. The cylindrical member 34 has an outer circumferential cylindrical surface and an inner circumferential cylindrical surface around a central axis 35. A female thread 36 extending upward from a lower end of the cylindrical member 34 is formed on the inner circumferential cylindrical surface.

In the embodiment, the cylindrical member 34 is embedded in the sphere 10. For this purpose, the south-pole 22 of the sphere 10 has a lower hole 38 or a recess formed around the central axis 18 along the central axis 18. The lower hole 38 can be formed integrally with the sphere at the time of molding by disposing a projection having a shape corresponding to the lower hole 38 on the inner surface of the mold. Alternatively, the lower hole 38 can be formed by machining the molded sphere.

The size and shape of the lower hole 38 is preferably the same as the size and shape of the outer circumferential cylindrical surface of the cylindrical member 34. This ensures that the cylindrical member 34 is fixed to the sphere 10 simply by fitting the cylindrical member into the lower hole 38. In order to fix the cylindrical member 34 to the sphere 10, the cylindrical member 34 may be fitted into the lower hole 38 with an adhesive applied to an inner surface of the lower hole 38 in advance. The central axis of the lower hole 38 coincides with the central axis 18 of the sphere 10 such that the central axis 35 of the cylindrical member 34 coincides with the central axis 18 of the sphere when the cylindrical member 34 is fitted in the lower hole 38.

The pole coupling portion 32 has a cylindrical member 42 extending along a central axis 40. An upper outer circumferential surface of the cylindrical member 42 has a male thread 44 formed around the central axis 40 of the cylindrical member 42 and extending from an upper end of the cylindrical member 42. A lower end of the cylindrical member 42 has a female thread 46 formed around the central axis 40 of the cylindrical member 42.

The male thread 44 is so sized and shaped as to be engaged in the female thread 36 of the sphere coupling portion 30. The female thread 46 is sized and shaped such that an upper end male thread 58 of the pin pole 50 described later can be engaged.

The pole coupling portion 32 so constructed is fixed by engaging the male thread 44 of an upper portion in the female thread 36 of the sphere coupling portion 30 fixed to the sphere 10.

In the embodiment, the pin pole 50 has a pole 52 and a pointed end 54.

The pole 52, which is made of a metal rod having a diameter of 6 mm or 8 mm, has a male thread 58 formed at an upper end along a central axis 56 of the pole 52 and a female thread 60 formed at a lower end along the central axis 56 of the pole 52. The size and shape of the male thread 58 is the same as the size and shape of the female thread 46 of the pole coupling portion 32.

The pointed end 54 has an upper cylindrical portion 64 having the same diameter as the pole 52 and a lower conical portion 66, both extending along a central axis 62. A male thread 68 is formed around the central axis 62 at the upper end of the upper cylindrical portion 64. The size and shape of the male thread 68 is the same as the size and shape of the lower end female thread 60 of the pole 52. Therefore, the pointed end 54 is assembled with the pole 52 by engaging the upper end male thread 68 into the lower end female thread 60 of the pole 52.

The sphere 10 and the pin pole 50 are usually carried unassembled to a surveying site where the sphere 10 and the pin pole 50 are coupled by engaging the upper end male thread 58 of the pin pole 50 into the female thread 46 of the pole coupling portion 32 to form the target device 1. In the assembled state, the central axis 18 of the sphere 10, the central axis 40 of the coupling mechanism 28, and the central axes 56, 62 of the pin pole 50 are aligned in a straight line.

The assembled target device 1 is placed with the pointed end 54 of the lower end of the pin pole positioned at the reference survey point such that the central axes of the sphere 10 and the pin pole 50 are both oriented in the vertical direction. In this state, the pin pole 50 may be vertically held by a holding device not shown. A verticality of an axis extending along the central axes 18, 56, 62 of the sphere 10 and the pin pole 50 is ensured by adjusting the inclination of the pin pole 50 while looking at the level 24 mounted at the upper end of the sphere 10. In this condition, nothing obstructs a user's view above the level 24, so that the user can accurately adjust the verticality by positioning the bubble 25 of the level 24 at the center of the circle 27 while looking the level 24 from directly above, as shown in FIG. 3. As a result, the center 12 of the sphere 10 can be positioned directly above the reference point.

Although in the previous embodiment the level 24 is entirely embedded in the sphere 10, at least a portion, for example, only the lower half, of the level may be embedded in the upper hole 26. Alternatively, the level 24 may be fixed to the surface of the sphere without being embedded in the sphere 10. Alternatively, a screw (male thread) may be provided at the center of the bottom of the level and a threaded hole (female thread) be formed in the north pole region of the sphere 10, so that the screw (male thread) of the level is engaged in the threaded hole (female thread).

Although in the previous embodiment the sphere coupling portion 30 is entirely embedded in the sphere 10, at least a portion, for example, only the upper half of the sphere coupling portion 30, may be embedded in the lower hole 38. Alternatively, the sphere coupling portion may be fixed to the surface of the sphere without being embedded in the sphere 10. Alternatively, a screw (male thread) may be provided at the center of the upper end of the sphere coupling portion and a threaded hole (female thread) be formed in the south pole region of the sphere 10, so that the screw (male thread) of the sphere coupling portion 30 is engaged into this threaded hole (female thread).

In the embodiment, a circular vial is used as the level; however, the level may be a level (two-way level) in which two tube levels are arranged in two orthogonal directions.

In the embodiment, the sphere 10 and the pin pole 50 are coupled via the coupling mechanism; however, a hole (non-threaded hole) or a threaded hole (female thread) may be formed in the south pole 22 of the sphere 10, so that the upper end portion (non-threaded portion) or the male thread of the pin pole 50 is fitted into the hole or the threaded hole.

What is claimed is:

1. A surveying target sphere for use in a three-dimensional measurement, the surveying target sphere having a center, a spherical surface having a constant radius from the center, a north pole, a south pole, and a central axis passing through the center of the surveying target sphere, the north pole, and the south pole, wherein the surveying target sphere comprises a level mounted at the north pole.

2. The surveying target sphere according to claim 1, wherein the level is adjusted such that the level indicates horizontality when the central axis is oriented in the vertical direction.

3. The surveying target sphere according to claim 1, wherein at least a portion of the level is embedded in an outer shape of the surveying target sphere.

4. The surveying target sphere according to claim 1, wherein the level is disposed on the surface of the surveying target sphere.

5. The surveying target sphere of claim 1, wherein the level is a circular bubble level.

6. The surveying target sphere of claim 1, wherein the level has two bubble tubes arranged in two orthogonal directions.

7. The surveying target sphere of claim 1, comprising a coupling mechanism at the south pole, wherein
the coupling mechanism is configured such that when a straight pin pole is coupled to the coupling mechanism, a center line of the pin pole coincides with the central axis of the surveying target sphere.

8. The surveying target sphere according to claim 7, wherein the coupling mechanism includes, in the south pole of the surveying target sphere, a hole into which the pin pole can be fitted along the central axis.

9. A surveying target device used for three-dimensional measurement, comprising:

a surveying target sphere having a north pole, a south pole, and a central axis passing through the center of the surveying target sphere, the north pole, and the south pole; and
a level mounted at the north pole.

10. The surveying target device of claim 9, wherein the surveying target sphere has a coupling mechanism mounted at the south-pole.

11. The surveying target device of claim 10, further comprising a pin pole coupled to the coupling mechanism of the surveying target sphere.

12. The surveying target device of claim 11,
wherein the coupling mechanism has a hole formed at the south-pole of the surveying target sphere, and
wherein the pin pole is configured such that one end of the pin pole can be fitted into the hole.

13. The surveying target device according to claim 12, wherein
the hole of the coupling mechanism has a female thread and the pin pole has a male thread at the one end of the pin pole so that the male thread of the pin pole is engaged into the female thread of the coupling mechanism.

14. The surveying target device of claim 11, wherein the other end of the pin pole has a pointed end.

* * * * *